United States Patent Office 3,199,560
Patented Aug. 10, 1965

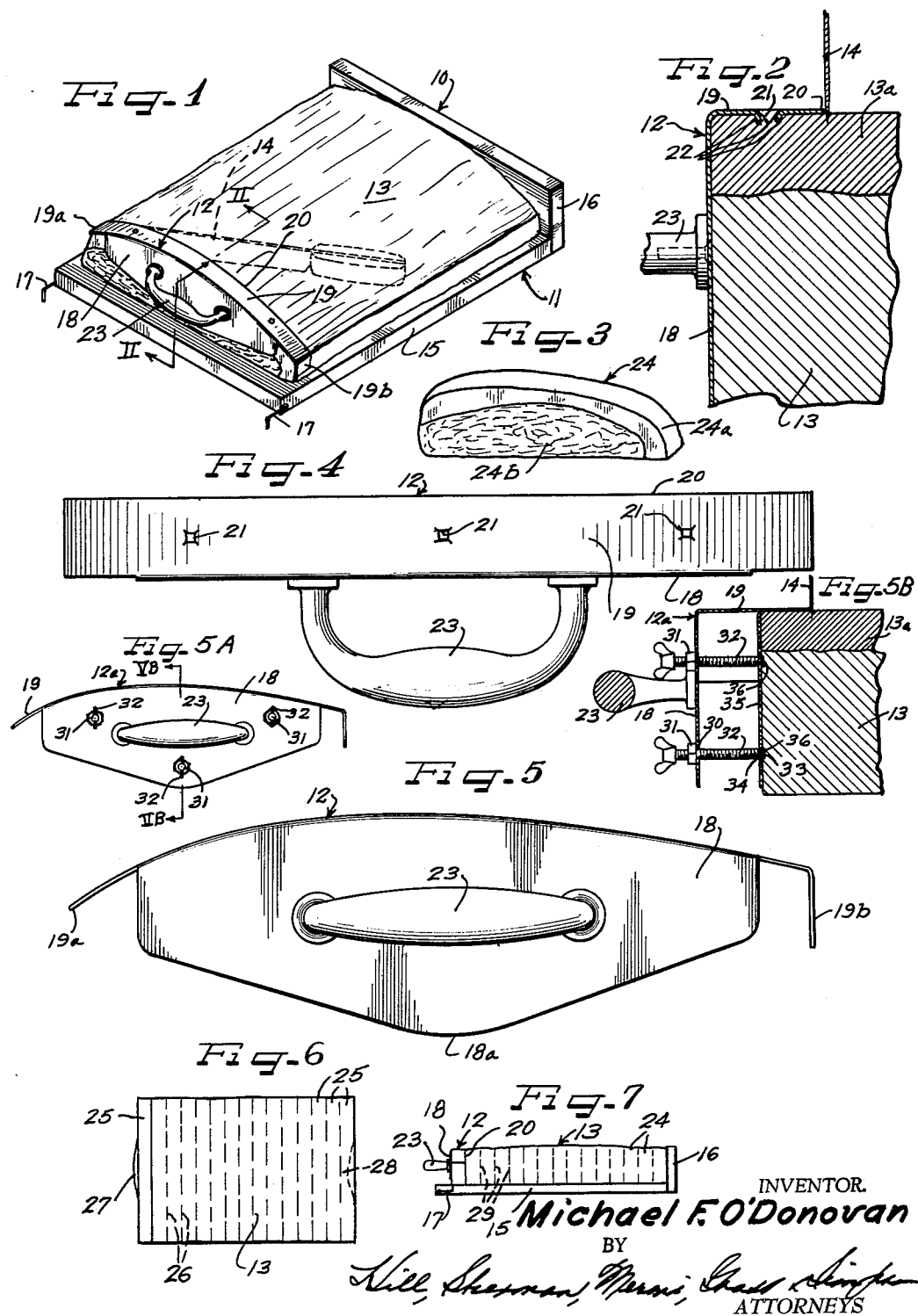

3,199,560
CUTTING GUIDE AND SUPPORT
Michael F. O'Donovan, Kenilworth, Ill., assignor by court decree to Elizabeth O'Donovan
Filed Oct. 16, 1961, Ser. No. 145,243
12 Claims. (Cl. 146—150)

This invention relates to a cutting guide and support board for producing uniform slices of meat or the like. More particularly this invention deals with a cutting guide and board which cooperate to insure the slicing of uniform slabs of meat or the like from a larger piece supported on the board.

The invention will hereinafter be specifically described as embodied in a cutting guide and support board for producing steaks of exact desired thickness from a boneless strip of beef, but it should be understood, of course, that the devices of this invention are not limited for use with any particular product or piece of meat since the guide and board of this invention will cooperate to produce uniform slices or slabs from any cuttable material supported on the board.

Strip steaks are now supplied in precut ready to cook form requiring costly handling by the supplier and creating expensive delivery problems. The steaks are usually ordered on a specified weight basis, such as 12, 14 or 16 ounces, and must not vary from the specified weight. Up to now production of such uniform steaks has required the services of expert butchers.

The present invention now avoids the necessity for precutting of the steaks prior to delivery to the consumer and makes possible the production of uniform steak cuts without error and without requiring the services of experienced butchers. The invention therefore opens up an entirely new field in meat handling since, for the first time, whole boneless strips can be shipped to the hotel, restaurant, club, or other point of consumption and sliced as needed by inexpensive kitchen help without waste or deviation from specified weight requirements. Boneless strips of beef produce from 12 to 16 strip steaks or Boston cuts and can now be shipped without precutting to thereby greatly reduce shipping costs as well as steak production costs.

According to this invention a cutting board having about the same size as the boneless strip to be supported thereon, is equipped with an upstanding end wall to form an abutment for one end of the strip. The opposite end of the strip is engaged by the cutting guide of this invention which has an end wall overlying the exposed strip end and cooperaitng with the upstanding wall on the cutting board to hold the strip firmly in an upright position. The cutting guide has a top flange contoured to fit the top of the strip in snug engagement therewith and the edge of this flange is spaced from the end wall of the guide a preselected distance to produce a steak of the desired thickness. For example, a cutting guide for a one inch steak would have a top flange one inch in width, a two inch steak would require a cutting guide with a top flange of two inches in width, etc. The guide preferably has teeth portions which penetrate the meat so as to prevent slippage or any relative movement between the guide and the meat during the cutting operation. The cutting knife is merely drawn along the edge of the guide and through the meat to produce the steak. The stroking of the knife blade against the edge of the guide serves to keep the knife in a sharpened condition.

The cutting board with a boneless strip thereon, the cutting guide, and the knife can be conveniently packaged in a single carton, preferably of the sleeve type, to provide a gourmet gift item that is easily shipped.

It is then an object of this invention to provide a cutting guide and support board which cooperate to produce uniform slices of cuttable material carried by the board.

A specific object of this invention is to provide a cutting board with an end wall forming an abutment and a cutting guide coacting with the board to hold a slab of meat or the like in firm upright position and to accurately gauge the thickness of cuts or slices of the material on the board.

A specific object of the invention is to provide a gourmet package of boneless strip or the like meat section including a cutting board and a cutting guide coacting to support the meat in the package and to insure the cutting of slices of uniform thickness.

Another specific object of the invention is to provide a cutting guide for meat and the like which supports the meat against bulging and provides for accurate slicing of uniformly thick meat cuts.

Another specific object of the invention is to provide an adjustable cutting guide for the production of food slices of preselected thickness.

A further and more specific object of the invention is to provide a cutting board for boneless strip beef slabs which provides an abutment for the slab and which can be held against movement on a table or the like support surface.

Other objects and features of this invention will become apparent to those skilled in this art from the following detailed description of the annexed sheet of drawings which, by way of preferred examples only, illustrates two embodiments of the invention.

On the drawings:

FIGURE 1 is an isometric view of the coacting cutting board and cutting guide of this invention and illustrating the manner in which a boneless strip of beef is cut into uniform strip steaks.

FIGURE 2 is a somewhat enlarged and fragmentary cross-sectional view taken along the line II—II of FIG. 1.

FIGURE 3 is an isometric view of a strip steak cut from the boneless strip slab shown in FIG. 1.

FIGURE 4 is an enlarged top plan view of the cutting guide of this invention.

FIGURE 5 is a side elevational view of the guide of FIG. 4.

FIGURE 5-A is a view similar to FIG. 5 but showing a modified guide with an adjustable end wall to vary the thickness of the cut or slice.

FIGURE 5-B is a cross-sectional view, similar to FIG. 2, but taken along the line VB—VB of the modified guide of FIG. 5-A.

FIGURE 6 is a diagrammatic plan view of a boneless strip slab illustrating the manner in which conventional cutting of steaks therefrom results in bulging and production of non-uniform steaks.

FIGURE 7 is a side elevational view of the combined cutter board and cutting guide of this invention supporting a boneless strip of beef in firm upright position for producing strip steaks of exact uniform thickness.

As shown on the drawings:

In FIG. 1 the reference numeral 10 designates generally the cutting guide and support of this invention composed of a cutting board 11 and a cutting guide 12 with a boneless strip of beef 13 supported on the board and being cut by a knife 14 as directed by the guide 12. The board 11 is composed of a flat piece of wood 15 just slightly larger than the strip 13 and having an upright wooden end wall 16 on one end thereof of a height substantially the same as the highest point of the strip 13. The board 15 and end wall 16 are preferably composed of hardwood maple although any suitable rigid material could be used provided it would not dull the knife 14 or spoil the slab 13. Suitable fasteners such as nails, screws, or even adhesives can be used to unite the end wall 16 to the board 15. The end of the board 15 opposite the end wall 16 preferably has hooks 17 pivoted to the sides thereof and adapted to be swung from positions within the confines of the sides to the positions shown in FIG. 1 with the hook ends adapted to engage a table, counter or block top so that the cutting board 15 will not slide away from the cutter during the cutting operation.

The cutting guide 12, as best shown in FIGS. 2, 4 and 5, has an end wall 18 sized to fit over the exposed end of the slab 13 on the board 15 without being bottomed on the board when the cutter is positioned on the slab as shown in FIG. 1. A top flange 19 is provided at right angles to the end wall 18 and projects from this end wall a distance equivalent to the desired thickness for steaks to be cut from the slab 13 to thereby provide a guide edge 20 for the knife 14. The flange 19 is contoured to snugly embrace the top of the slab 13 and as shown in FIG. 5 has a curved contour extending upwardly from a front end 19a to a high point and then sloping downwardly to a vertical end portion 19b. As shown in FIG. 1 this end portion 19b bottoms against the tail end of the strip 13 while the forward edge 19a can allow the front or head end of the strip to project therebeyond.

Several lanced portions 21 are provided at intervals along the flange 19 as shown in FIG. 4 to create teeth 22 as shown in FIG. 2 which bite into the fat cover 13a of the strip 13 to thereby prevent any relative movement between the meat 13 and the cutting guide.

A handle 23 is provided on the end wall 18 and projects therefrom at the central area of the end wall to form a convenient easily grasped holder for the cutting guide 12.

To produce uniform steaks such as 24 shown in FIG. 3 from the boneless strip slab 13 shown in FIG. 1 it is only necessary to place the slab 13 on the cutting board 15 with one end thereof tightly butted against the backboard 16 and with the hooks 17 engaging the support surface for the board as by extending the hook ends over the edge of the surface. The guide 12 is then placed snugly over the exposed end of the strip 13 with the end wall 18 tightly against the exposed end surface of the slab and with the turned down end edge 19b of the flange 19 bottomed against the tail end of the slab. For this purpose the cutter will grasp the handle 23 in his left hand, bottom the turned down flanged end 19b against the tail of the slab 13, rock the guide 12 to move the flange 19 into snug engagement with the top of the slab 13 and at the same time push the end wall 18 against the exposed end of the slab in a direction toward the abutment wall 16. This will hold the slab 13 firmly on the board between end abutments which prevent any bulging of the slab during the cutting operation. The end wall 18 is of sufficient depth to engage the major portion of the exposed end face of the slab 13 but is not deep enough to bottom on the board 15 and interfere with full seating of the flange 19 along the top of the slab. If desired the end wall can extend all the way between the ends 19a and 19b of the flange 19. The bottom edge of the end wall 18 is preferably contoured to slope upwardly from a deep central portion 18a to the ends of the flange 19 as shown in FIG. 5 thereby providing a central depth which is more than sufficient to cover the eye of the strip. When the teeth 22 of the flange 19 are embedded in the fat 13a of the slab 13 therefore the end wall 18 will be tightly butted against the exposed end of the strip as shown in FIG. 2. The guide edge 20 of the flange 19 is then held firmly over the entire slab and when the knife 14 is drawn along this guide edge 20 with a cutting action downwardly through the slab 13 a steak 24 of uniform thickness must be produced. This steak 24 has a layer of fat 24a around the top thereof and solid boneless meat 24b underlying the fat.

When the first steak 24 is cut from the end of the slab 13 the cutting guide 12 can be rocked away from the slab 13 and the steak 24 easily removed. To then cut the next steaks from the slab it is only necessary to repeat the operation in sequence all the way up to the next to the last steak adjacent the backboard 16. In this connection it will be appreciated that when only a narrow piece of the slab 13 remains it will still be possible to hold this narrow piece in firm upright position on the board 15 between the end abutments 16 and 18 so that the cutting knife can easily be drawn across the guide edge 20 to produce the two remaining steaks. Heretofore this last cut was extremely difficult for reasons that will be more evident from the description of FIG. 6.

As shown in FIG. 6 the boneless strip 13 is to be cut into a plurality of steaks 25 in the conventional manner by merely placing the slab 13 on the cutting block and successively drawing the cutting knife along the dotted lines 26. To produce the first steak 25 at the left hand end of the slab 13 the butcher must press down on the thin marginal end portion of the slab with the fingers of his left hand to draw the cut away from the slab as the cutting progresses from top to bottom. This pressure produced a bulge 27 usually at the eye of the steak and of course the eye will thereupon be thicker than the unbulged portions of the steak. This pressing and cutting of each successive steak 25 from the slab 13 will rob the eye portions of the successive steaks so that the last steak at the right hand end of the slab will have a very thin eye section 28. Thus conventional cutting methods cannot produce steaks 24 of uniform thickness and will always result in at least one steak which is inferior because of a very thin eye section. Since the eye of the steak is the highest quality portion it can be appreciated that prior known cutting practices are wasteful even though performed by experienced butchers.

By way of contrast, as diagrammatically illustrated in FIG. 7, the slab 13 on the board 15 is firmly held between the backboard 16 and the end wall 18 of the cutting guide 12 so that bulging is impossible even when top pressure is applied during the cutting operation. Thus when cuts 29 are made along the guide edge 20 of the guide 12, steaks 24 of uniform thickness must be produced.

FIGS. 5–A and 5–B illustrate another embodiment of the cutting guide of this invention which is equipped with an adjustable end wall carried by the fixed end wall for varying the guide depth or thickness so that the guide edge can be positioned at any selected distance from the end of the meat slab up to the full width of the flange without loss of full end support for the slab. The adjustable guide 12a of FIGS. 5–A and 5–B has all of the advantages and features of the guide 12 plus the adjustable end wall. Parts identical with the parts of guide 12, hereinabove described, have been identified by the same reference numerals.

The cutter guide 12a preferably has a relatively wide or deep top flange 19. A width of from 2 to 3 inches is desirable. The end wall 18 has several, preferably three, holes 30 punched therethrough in spaced, preferably triangular relation. Nuts 31 are welded on the outer face of the end wall 18 in alignment with the holes 30. Wing-headed bolts 32 are threaded through the nuts 31 and extend through the holes 30 under the flange 19. These bolts 32 have reduced diameter ends 33 providing shoulders 34. An adjustable end wall or plate 35 following the contour of the end wall 18 but sized to fit within the confines of this end wall, has holes therethrough receiving the reduced diameter ends 33 of the bolts 32. The end wall 35 is bottomed on the shoulders 34 of the bolts and the reduced diameter ends 33 of the bolts are peened or headed to form enlarged head portions 36 overlying the wall 35 so that the wall will be held against lateral shifting on the bolts between the shoulders 34 and the heads 36. The bolts 32 however are freely rotatable in the holes of the plates 18 and 35. Therefore rotation of the bolts 32 relative to the nuts 31 will shift the plate 35 toward and away from the end wall 18 to thereby vary the gauging width of the cutter 12a.

As illustrated in FIG. 5-B when the end wall 35 is bottomed on the end face of the slab 13 and the flange 19 positioned in snug overlying relation on the fat cover 13a, the guiding edge 20 for the knife 14 can be positioned closer to the end wall of the slab than when the end wall 18 of the guide is bottomed on the slab. In this manner slices or cuts can be gauged in thickness for any preselected amounts up to the full width of the flange 19. For example when the plate 35 is moved against the end wall 18, the cutting edge 20 will be positioned to gauge thick cuts of the slab 13. Conversely when the end wall or plate 35 is moved inwardly away from the end wall 18, the cutting edge 20 will be positioned closer to the end of the slab and thinner cuts will be produced.

The triangular arrangement of the bolts 32 provides a very stable support for the adjustable end wall or plate 35.

The guides 12 or 12a of this invention can be made of any suitable rigid material such as metal or plastic, but it is preferred to provide a guide edge 20 of sufficient hardness to sharpen the knife 14 as it is stroked thereacross during the cutting operation. For this purpose stainless steel flanges 19 are desirable.

From the above description it can be appreciated that an assembly such as shown in FIG. 1 can be easily packaged in a carton and sold as a de luxe gift item for use by the amateur chef who can produce steaks of more uniform thickness than have heretofore been produced by experienced butchers. For such gift package use the guides 12 can be of relatively light gauge inexpensive materials. It will also be understood that the guides 12 can be made of heavy gauge metal such as stainless steel for providing a permanent tool for butchers, chefs, and the like. The devices of this invention render foolproof the production of meat cuts of desired thicknesses and the guides can be produced with flanges 19 of any desired width to produce the desired cut.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A steak cutter or the like which comprises a flat cutting board having an upright end wall dimensioned for supporting and abutting substantially an entire end face of a boneless strip of beef or the like, hooks on said board adjacent the end thereof remote from said end wall adapted to be swung into position for engaging the edge of a table top or the like, a cutting guide having an end wall for overlying and abutting substantially the entire opposite end face of the boneless strip or the like on said cutting board in opposition to the end engaged by the end wall of the board, a handle on said cutting guide to hold said end wall against said boneless strip end, and a flange on said cutting guide shaped for overlying and engaging the boneless strip on the cutting board and for providing a knife guiding edge spaced from the end wall of the cutting guide a preselected distance to produce steaks of desired thickness.

2. A cutting guide and support which comprises a cutting board having an upstanding abutment at one end thereof and table top engaging hooks at the other end thereof, a cutting guide having an end wall for opposing the abutment of the cutting board to cooperate therewith for holding material to be cut in firm upright position therebetween, a top wall on said guide shaped for overlying and engaging material on said board to be cut, and a guide edge on said top wall for directing a knife therealong to insure slices of uniform thickness.

3. A cutting guide which comprises a member having an end wall adapted to overlie and engage the end of material to be cut and a top wall contoured to overlie and engage the top of the material to be cut, said top wall providing a guiding edge spaced from said end wall in parallel relation thereto to direct a knife therealong, and a handle on said end wall adapted to be manually grasped for holding the guide on the material to be cut.

4. A steak cutting guide which comprises a member having a flat end wall adapted to abut the eye portion of a steak to be cut from a slab of meat, a flange on said end wall for overlying and engaging the slab of meat, a guide edge on said flange spaced from and parallel with said end wall for directing a knife therealong, a turned down flange portion on one end of the flange for engaging the tail portion of the slab of meat to be cut, and a handle projecting from the end wall adapted to be manually grasped for holding the guide in position on the slab.

5. A cutting guide which comprises a member having an end wall adapted to abut an end face of material to be cut, a handle on said end wall projecting in one direction therefrom, a flange on said end wall projecting in the opposite direction and adapted to overlie the material to be cut, said flange having a width selected to correspond with the thickness of a slice to be gauged by said guide, teeth on said flange for biting into material to be cut, and said flange having a guiding edge spaced from and parallel to said end wall for directing a knife therealong and adapted to sharpen the knife as it is stroked against the edge.

6. An adjustable cutting guide which comprises a member having a top flange adapted to overlie and snugly engage the surface of material to be cut, an end wall integral with said flange in right angle relationship therewith, a plate underlying said flange, means mounting said plate on said end wall in relatively shiftable relation toward and away from the end wall under said flange, said plate adapted to be bottomed against the end face of material to be cut for positioning the edge of the flange a preselected distance from the end face of material to be cut to thereby control the thickness of a slice.

7. An adjustable cutting guide which comprises a member having a relatively wide top flange contoured to the shape of material to be cut and arranged to snugly embrace said material, support means in right angular relation to said flange at one end of the flange, and end plate mounted on said support means under said flange for providing an abutment face to engage the end of material to be cut, means for shifting said end plate under said flange toward and away from the support means, and said flange having a knife guide edge along the length thereof.

8. An adjustable meat cutting guide or the like which comprises a member having an end wall and a top flange in right angular relationship therewith providing a cutting guide edge, a handle on said end wall adapted to position the member against material to be cut with the flange overlying the material, an end plate under said flange adapted to engage the end face of material to be cut, and bolt means threaded through said end wall and rotatably secured to said end plate for moving the end plate toward and away from said end wall to thereby vary the cut gauging depth of the guide.

9. An adjustable slicing guide comprising: a mounting plate provided with a forwardly projecting flange adapted to be disposed about one end of an object which is to be sliced, said forwardly projecting flange being provided with a transversely directed knife guide edge generally parallel to said mounting plate and adapted to engage a knife blade and maintain it in a plane substantially transverse to an end of said object to be sliced disposed within said forwardly projecting flange, an abutment plate positioned forwardly of said mounting plate and adapted to forcibly abut the end of said object to be sliced, and means for shifting said abutment plate toward and away from said mounting plate to thereby control the thickness of the slice.

10. An adjustable slicing guide comprising: mounting plate means provided with forwardly projecting receiving means adapted to be disposed about one end of an object which is to be sliced, said forwardly projecting receiving means being provided with transversely directed knife edge guiding means generally parallel to said mounting plate means and adapted to engage a knife blade and maintain it in a plane substantially transverse to an end of an object to be sliced disposed within said forwardly projecting receiving means; abutment plate means positioned forwardly of said mounting plate means and adapted to forcibly abut the end of an object to be sliced received within said forwardly projecting receiving means, and extension and retraction means coacting with said mounting plate means and abutment plate means for controlling the spacing of said abutment plate means from said transversely directed knife edge guiding means to thereby control the thickness of a slice cut from said object by the knife blade engaging said knife edge guiding means.

11. A slicing guide as defined in claim 10 wherein said mounting plate means is provided with manually graspable handle means on the side opposite thereof from said forwardly projecting receiving means.

12. An adjustable slicing guide comprising mounting plate means adapted to overlie an end of an object to be sliced, a forwardly projecting flange on said mounting plate means adapted to surround a portion of said object, said flange having a knife edge cutting guide generally parallel to said mounting plate means and adapted to engage a knife blade to direct the knife in a plane substantially transverse to the end of the object to be sliced which is disposed within said flange, abutment plate means under said flange and positioned forwardly of said mounting plate means for abutting the end of an object to be sliced which is received within said flange, and means coacting with said mounting plate means and said abutment plate means for shifting the abutment plate means relative to said knife edge guiding means to vary the thickness of a slice to be cut from the object.

References Cited by the Examiner

UNITED STATES PATENTS

| | | | |
|---|---|---|---|
| 1,334,696 | 3/20 | Garlock | 146—150 |
| 1,440,374 | 1/23 | Chow | 146—215 |
| 1,589,030 | 6/26 | Whiting | 146—150 |
| 1,729,624 | 10/29 | Meier | 146—216 |
| 1,871,713 | 8/32 | Lowenthal | 146—216 |
| 1,952,644 | 3/34 | Walter. | |
| 2,206,154 | 7/40 | Bixler | 146—150 |

J. SPENCER OVERHOLSER, *Primary Examiner.*

CARL W. ROBINSON, JOHN C. CHRISTIE,
*Examiners.*